United States Patent [19]

Walsh

[11] Patent Number: 5,375,241
[45] Date of Patent: Dec. 20, 1994

[54] METHOD AND SYSTEM FOR DYNAMIC-LINK LIBRARY

[75] Inventor: James E. Walsh, Redmond, Wash.

[73] Assignee: Microsoft Corporation, Redmond, Wash.

[21] Appl. No.: 994,149

[22] Filed: Dec. 21, 1992

[51] Int. Cl.⁵ ............................ G06F 9/00; G06F 9/40
[52] U.S. Cl. ............................. 395/700; 364/DIG. 1; 364/280
[58] Field of Search ................ 395/700; 364/DIG. 1, 364/280

[56] References Cited

FOREIGN PATENT DOCUMENTS 0336552 11/1989 European Pat. Off. ....... G06F 9/44

OTHER PUBLICATIONS

Syck, G. "Dynamic Link Libraries for DOS" Dr. Dobb's Journal of Software Tools, v. 15, No. 5, pp. 30-39, (1990).
Graeme Burton "OS/L DLLS" (tutorial), EXE v. 5 No. 2 pp. 36(3) (Jul. 1990).
"Dynamic-Link Libraries" Microsoft Windows 3.1 Guide to programming chapter 20:459-497.
Prouse, "Stand-Alone Code, ad nauseam" Macintosh Technical Notes, Developer Technical Support 256:1-32, Aug. 1990.

Primary Examiner—Gareth D. Shaw
Assistant Examiner—A. Katbab
Attorney, Agent, or Firm—Seed and Berry

[57] ABSTRACT

A dynamic-link library method and system for providing services to one or more application programs. The system includes a code resource that includes a plurality of service routines to allow any of the programs to use the service routines. The code resource is physically distinct from the application programs and does not have to be copied into the application programs, which allow the code resource and the application programs to be updated, compiled, and tested separately from each other. A selector routine receives the selection information from the stub routine, and in response thereto accesses the associated service routine and causes the associated service routine to perform its intended service. Preferably, the stub routine allocates parameters to be used by the associated service routine and passes the parameters to the selector routine along with the selection information. Preferably an interface routine is used to translate an index to the code resource into a selector pointer to the selector routine. The interface routine receives the selection information from the stub routine and passes the selection information to the selector routine using the selector pointer. A resource initiation routine loads and locks the code resource into memory. The resource initiation routine allocates resource global variables space for storing resource global variables used by the code resource. The selector routine saves an index to program global variables space for storing program global variables, the index being previously stored in a register. The selector routine stores an index to the resource global variables space into the register. After a service routine performs its service the selector routine restores the index to the program global variables space into the register. When the services of the code resource are no longer needed the current main program calls a resource termination routine. The resource termination routine unlocks the code resource in and disposes of the index to the resource global variables space.

29 Claims, 4 Drawing Sheets

METHOD AND SYSTEM FOR DYNAMIC-LINK LIBRARY

TECHNICAL FIELD

The present invention relates to computer program interfacing, and more particularly to a system and method for dynamically linking one of a plurality of service routines with one or more main programs.

BACKGROUND OF THE INVENTION

An application program usually includes a number of separate routines. Typically, the routines include a main program and several subsidiary routines referred to as objects, modules or resources. Execution of the application program begins with the main program with calls being made to the subsidiary routines. In order to operate as a complete program, prior to execution these routines are linked together using a linker such as Microsoft Segmented Executable Linker (Link). The linker copies each of the routines into an executable (.EXE) file for the application program. The linker also provides each of the routines with information identifying the locations of other routines so that the routines can access each other. The executable file can then be executed by the computer according to the instructions in the routines.

A dynamic-link library is an executable module containing services that application programs can call to perform useful tasks. Dynamic-link libraries exist primarily to provide services to application programs. These libraries play an important role in operating systems, such as Windows and OS/2, which use them to make their services and resources available to the application programs.

Dynamic-link libraries are similar to run-time libraries, such as C-language run-time libraries. The main difference between dynamic-link libraries and run-time libraries is that dynamic-link libraries are linked with the application program at run time, not when the application program files are linked with the linker. Linking a library with an application program at run time is referred to as dynamic-linking; linking the library with an application program by using the linker is referred to as static linking.

One way to understand dynamic-link libraries is to compare them to static-link libraries. An example of a static-link library is MLIBCEW.LIB, the medium model Windows C-language run-time library. MLIBCEW.LIB contains the executable code for C-language run-time services such as strcpy, which copies character strings from one memory location to another. Such C-language run-time services are used by an application program without having to include the source code for those services. When linking a C-language compiled application program, the linker incorporates information from the appropriate static-link library. Wherever the application program uses a C-language run-time service, the linker copies that service to the application program's executable file.

The primary advantage of static-link libraries is that they make a standard set of services available to application programs, and do not require the application programs to include the original source code for those services. However, because static-link libraries are incorporated into the executable code of the application program, the static-link libraries and application programs lose their physical distinctness when linked. As a result, neither the application programs nor the static-link libraries can be updated without having to re-link the static-link libraries with the application programs.

Another problem with static-link libraries is that they are inefficient in a multitasking system such as the Windows operating system. If two application programs are running simultaneously and they use the same static-link library service, there will be two copies of that service present in the system. It would be more efficient for both application programs to share a single copy of the service, but static-link libraries provide no facility for sharing code between application programs.

With dynamic-link libraries, on the other hand, several application programs can share a single copy of a service. If two application programs are running at the same time using the Windows operating system and both use a particular service, both can share a single copy of the source code for that service.

In addition to being able to share a single copy of code, application programs using dynamic-link libraries can share other resources, such as data and hardware. For example, Windows fonts are text-drawing data that application programs can share by means of dynamic-link libraries. Likewise, Windows device drivers are dynamic-link libraries that application programs can use to share access to hardware resources.

Since a dynamic-link library is linked at run time, not with a linker, a copy of the library is not inserted into the application program's executable file. Instead, a copy of the library is loaded into memory while the application program is running. As a result, the application program and dynamic-library are always physically distinct. Such distinctness allows the application program and dynamic-link library to be updated, compiled, and tested separately from each other.

In order to access a dynamic-link library at run time, the application program must be able to obtain information indicating where to find the dynamic-link library. One method provided by the Windows operating system is to use an import library, which contains information regarding where to locate the dynamic-link library at run time. During linking, the linker uses static-link libraries and import libraries to resolve references to external services. As noted above, when an application program desires a service from a static-link library, the linker copies the code for that service into the application program's executable file. When the application program desires a service from a dynamic-link library, however, the linker does not copy any code from the dynamic-link library. Instead, the linker searches all defined import libraries to find one that contains the necessary information regarding the location of the dynamic-link library. The linker copies the necessary information from the import library to create a dynamic-link between the executing application program and dynamic-link library.

Many operating systems do not employ dynamic-link libraries. For example, the Macintosh operating system does not provide dynamic-link libraries. The Macintosh operating system does not include any import libraries or other means to provide dynamic-linking between application programs and dynamic-link library services. Some background information on the Macintosh computer system, including its operating system, may be helpful in order to understand how it differs from the Windows Operating System and OS/2.

The Macintosh computer system 10 includes a central processing unit (CPU) 12, a read-only memory (ROM) 14, a working memory 16 and an input/output (I/O) system 18 that are connected by a data bus 20, as shown in FIG. 1. The I/O system communicates with a disk storage unit 22 to pass information between the disk storage and the data bus 20. The disk storage unit can be a magnetic storage device, such as a hard disk or a floppy disk, or any other device for storing programs and data.

The working memory 16 includes a memory section known as an application heap 24 that is used to store a loaded application program 26 and other routines. The working memory includes a stack 28 that is used by the CPU 12 when executing instructions of the application program or other routines called by the application program. The stack stores local variables, and a return address of the routines currently loaded in the heap. A stack pointer (SP) 30 points to the most recent item pushed onto the stack.

The Macintosh computer system 10 includes an operating system 32 located in the ROM 14 that interfaces the application program 26 and other software to the computer system hardware. The working memory 16 includes a system heap 33 that the operating system 32 uses to store its routines. Each of the routines in the operating system is accessible to all routines, including the routines of the application program.

As shown in FIG. 1, the Macintosh operating system 32 includes a memory manager 34 that controls the location of blocks of memory in the working memory 16. The memory manager provides the application program and other routines with blocks of memory from the heap and releases memory areas that are no longer needed to the heap. Blocks of memory in the heap can be allocated and released in any order.

Each memory block allocated by the memory manager 34 is either relocatable or nonrelocatable and is accessed by an index returned by the memory manager. The index for a nonrelocatable block is a pointer that directly addresses the block. The index for a relocatable block is a handle that indirectly addresses the block. The handle points to a nonrelocatable master pointer that points to the relocatable block. If the relocatable block is moved, the contents of the master pointer are changed to reflect the new location of the segment, while the handle continues to point to the unmoved master pointer. In contrast, a nonrelocatable block never moves, so the pointer to it never changes.

One reason that the Macintosh operating system has failed to provide for dynamic-link libraries is because of the stiffly-structured working memory 16 of the Macintosh computer system 10. The Motorola MC68000 microprocessors used in early versions of the Macintosh computer system were unable to specify memory offsets greater than 32K. As a result, routines in the working memory 16, including application programs, had to be smaller than 32K bytes or had to be divided into memory segments 36 having less than 32K bytes. The microprocessors in more recent versions of the Macintosh computer system eliminated the 32K requirement, but most routines have continued to be limited to less than 32K bytes or to be divided into 32K segments in order to be compatible with the older machines. This presents a problem because the Macintosh operating system 32 allows application programs to be segmented, but other routines cannot be segmented.

The Macintosh system allows a user to create special routines known as stand-alone code that are not statically linked to any application program. A stand-alone code module exists as a single Macintosh resource that performs a service or services for an application program. A stand-alone code module is loaded and executed at run time without being divided into memory segments. Stand-alone code modules are discussed in Prouse, *Macintosh Technical Notes #256: Stand-Alone Code, ad nauseam*, August 1990, which is incorporated herein by reference in its entirety.

It is often necessary for a stand-alone service routine, especially one that performs services of greater than a minor complexity, to specify global variables. Global variables, in contrast to local variables, can be used by plural routines and can persist between repeated invocations of a single routine by the application program 26. This presents a problem when using the Macintosh computer system 10, because the Macintosh operating system 32 automatically provides space for global variables only for an application program 26 and not for any other routines.

When the Macintosh operating system 32 loads an application program 26 it uses runtime routines to create a structure in the application heap 24 called an A5 world 37. It is called an A5 world because the A5 register 38 of the CPU 4 holds a pointer 40 that directly or indirectly points to several important data structures used by the application program or the Macintosh operating system. The A5 register pointer 40 directly points to global variable space 42 used to store global variables that can be used by any routine.

Since a stand-alone code module is not an application program, it is not automatically provided with an A5 world of its own. As a result, a stand-alone code module normally does not use global variables of its own. This feature causes most stand-alone code modules to be limited to relatively small routines performing simple services.

*Macintosh Technical Note #256*, at pages 14–15, discloses source code for several routines that create a custom A5 world for a stand-alone code module. The custom A5 world allows the stand-alone code module to use global variables of its own. However, nothing in the Technical Note teaches how to use a stand-alone code module to provide the Macintosh system with the dynamic-linking capabilities provided by the Windows operating system and OS/2.

As discussed above, the Windows operating system enables dynamic-linking of dynamic-link libraries to programs by using import libraries. The Macintosh operating system does not provide any import libraries or other means to dynamically link libraries to programs. As a result, the Macintosh operating system does not share Windows' ability to efficiently share libraries without copying the service routines of the library into each program that desires the services provided by the routines.

SUMMARY OF THE INVENTION

The present invention provides a dynamic-link library method and system for providing services to one or more programs such as application programs. The system includes a stand-alone code resource having a plurality of service routines to allow any of the programs to use the service routines. The code resource is physically distinct from the application programs, which allows the code resource and application programs to be updated, compiled, and tested separately from each other. Further, the system and method preferably allow for a single copy of the code resource to be used simultaneously with any number of main programs, without requiring a linker or compiler to make copies of the code resource for each program.

The invention includes one or more stub routines, each stub routine being associated with one of the service routines. Each stub routine contains selection information that identifies the associated service routine. A selector routine receives the selection information from the stub routine, and in response thereto accesses the associated service routine and causes the associated service routine to perform :its intended service. Optionally, the stub routine allocates parameters to be used by the associated service routine and passes the parameters to the selector routine along with the selection information. Preferably the selection routine is incorporated into the code resource at a known location, such as the beginning of the code resource.

A preferred embodiment of the invention includes an interface routine that contains addressing information needed for accessing the selector routine. The interface routine translates an index to the code resource into a selector pointer to the selector routine. The interface routine receives the selection information from the stub routine and passes the selection information to the selector routine using the selector pointer.

Preferably, a resource initiation routine loads and locks the code resource into memory. The resource initiation routine allocates space for resource global variables used by the code resource. The selector routine saves into a second location from a first location an index to space for storing program global variables. The selector routine stores an index to space for storing resource global variables into the first location. When the embodiment is used with a Macintosh computer, the first location is the A5 register of the computer.

After a service routine performs its service the selector routine restores the index to the space for storing program global variables from the second location into the first location. When the services of the code resource are no longer needed the program currently executing calls a resource termination routine. The resource termination routine unlocks the code resource in memory to allow its memory space to be used for other purposes. The resource termination routine also disposes of the index to the resource global variable space.

DETAILED DESCRIPTION OF THE INVENTION

Figure 1:
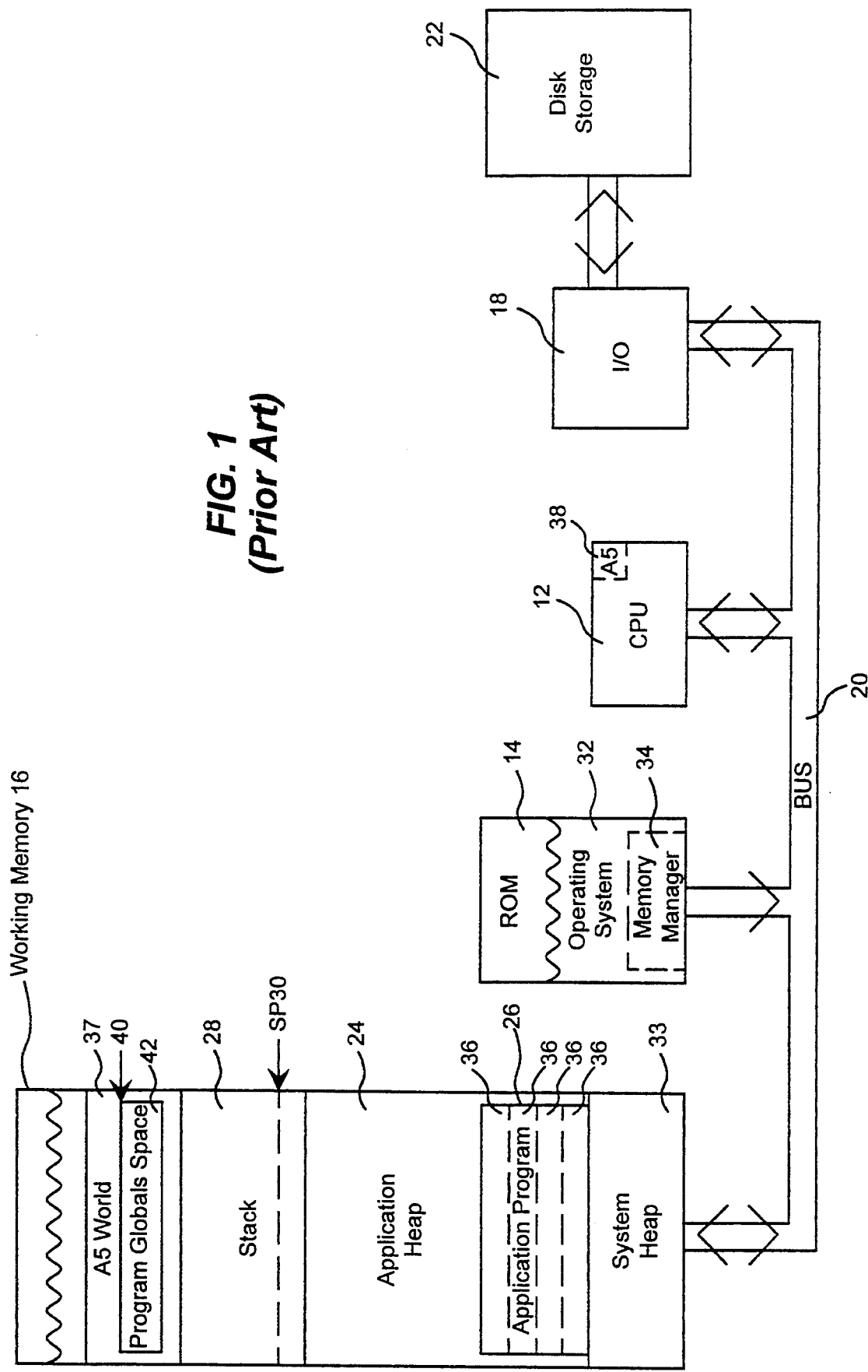
FIG. 1 is a block diagram of the Macintosh computer system according to the prior art.
Figure 2:
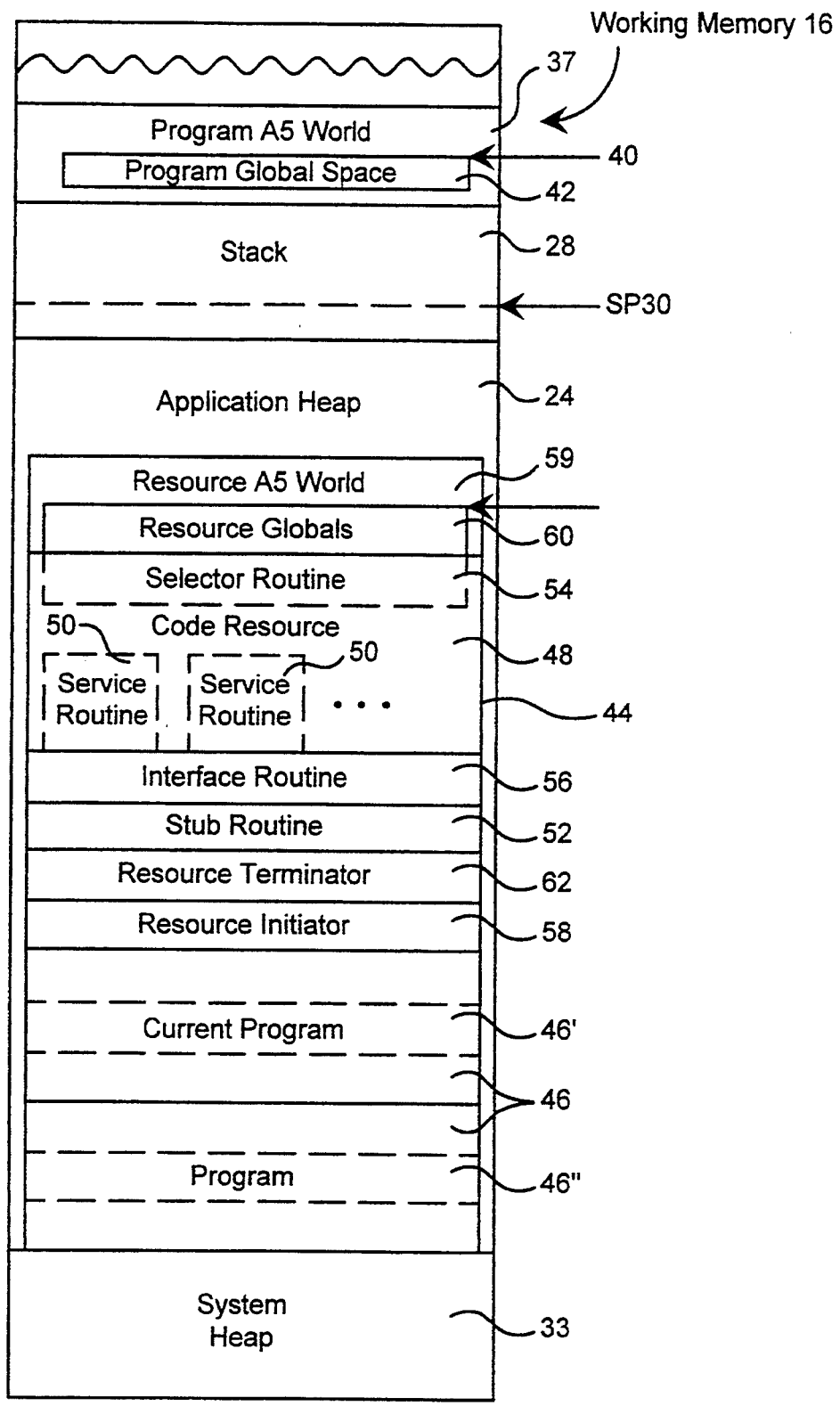
FIG. 2 is a diagram of Macintosh working memory space according to the present invention.

A preferred embodiment of a dynamic-link library system 44 according to the present invention is shown in FIG. 2. The emulation system 44 provides dynamic-link library capabilities that are similar to those provided by Windows and OS/2 for operating systems such as the operating system used with Macintosh computers. The preferred embodiment described herein is implemented on a conventional data processing system like that shown in FIG. 1. The discussion below focuses on the Macintosh operating system, but those of ordinary skill in the art will understand that embodiments of the invention may be used to provide dynamic-linking capabilities with other operating systems.

Code for the system 44 can be held in the working memory 16 along with one or more programs 46. The system 44 includes a code resource 48 that the system interfaces with the one or more programs 46. The code resource is a stand-alone module that includes a plurality of service routines 50. The programs 46 may be operating system programs, such as keyboard-, pen- or voice-based operating systems, or application programs, such as word processing, spreadsheet, or database programs. The service routines may be any routines that can be advantageously employed to provide services for the main programs, such as spelling or grammar checkers, device drivers, fonts, or icons. The system of the present invention provides an efficient means for a single copy of the code resource to be used with any number of programs, without requiring a linker or compiler to make copies of the code resource for each program. Hence, the code resource is a dynamic-link library module.

The system 44 includes one or more stub routines 52 associated with the service routines 50. Each stub routine 52 preferably is exclusively associated with a corresponding service routine 50. Each stub routine is provided with a service routine identifier that is used to access its corresponding service routine. When called by one of the programs 46, a stub routine transmits its service routine identifier to a selector routine 54 of the code resource 48. The selector routine uses the service routine identifier to call the appropriate service routine 50 and cause the service routine to perform its intended service.

In a preferred embodiment the selector routine 54 is incorporated in the code resource 48. When the code resource is loaded, the memory manager 34 (FIG. 1) provides an index for accessing the memory block occupied by the code resource. Since the selector routine is not a separately loaded routine, the memory manager cannot give it an index. To provide the stub routines 52 with access to the selector routine, the system 44 includes an interface routine 56 that is programmed with information regarding where the selector routine is located with respect to the beginning of the code resource. The interface routine 56 translates the index of the code resource into a pointer to the selector routine by adding the number of address locations between the first instruction in the code resource and the first instruction of the selector routine. Alternatively, each stub routine can be programmed with the information regarding the relative location of the selector routine and can translate the relative location into a selector routine pointer, thereby making the interface routine unnecessary.

The interface routine 56 is particularly useful where the code resource 48 is not locked between successive calls because it enables the Macintosh memory manager 34 to relocate the code resource. The potential for relocation requires that the index to the code resource be a handle rather than a pointer to access the code resource. As discussed above, the handle addresses a master pointer that points to the code resource. The interface routine uses the handle to obtain the code resource master pointer and then translates the code resource master pointer to a selector pointer by adding the appropriate offset as discussed above.

The dynamic-link library system 44 includes a resource initiator routine 58 that loads and locks the code resource 48 into the working memory 16. The resource initiator routine creates an A5 world 59 for the code resource and allocates resource global variable space 60 which stores global variables for use by the code resource. A resource terminator routine 62 unlocks the code resource and returns execution to the program 46 when the code resource is no longer needed.

In one embodiment, the resource initiator routine 58 loads the code resource 48 into the application heap 24 as shown in FIG. 2. In an alternate embodiment, the resource initiator routine loads the code resource into the system heap 33. When in the system heap the code resource can be accessed by two or more programs simultaneously. In contrast, when the code resource is loaded into the application heap 24, only the program that called the code resource can access it.

Normally the resource terminator routine 62 unlocks the code resource 48 when a current program 46' no longer needs the code resource. However, if the code resource is loaded in the system heap 26, another program 46" may be using the code resource, so the resource terminator routine should not unlock the code resource. To prevent premature unlocking, the code resource includes a counter that increments a count value each time that the code resource is called and decrements the count value each time a program calls the resource terminator routine to attempt to unlock the code resource. The resource terminator routine determines whether the count value has been decremented to its initial value before unlocking the code resource. The resource terminator routine only unlocks the code resource if the count value equals its initial value.

Figure 3:
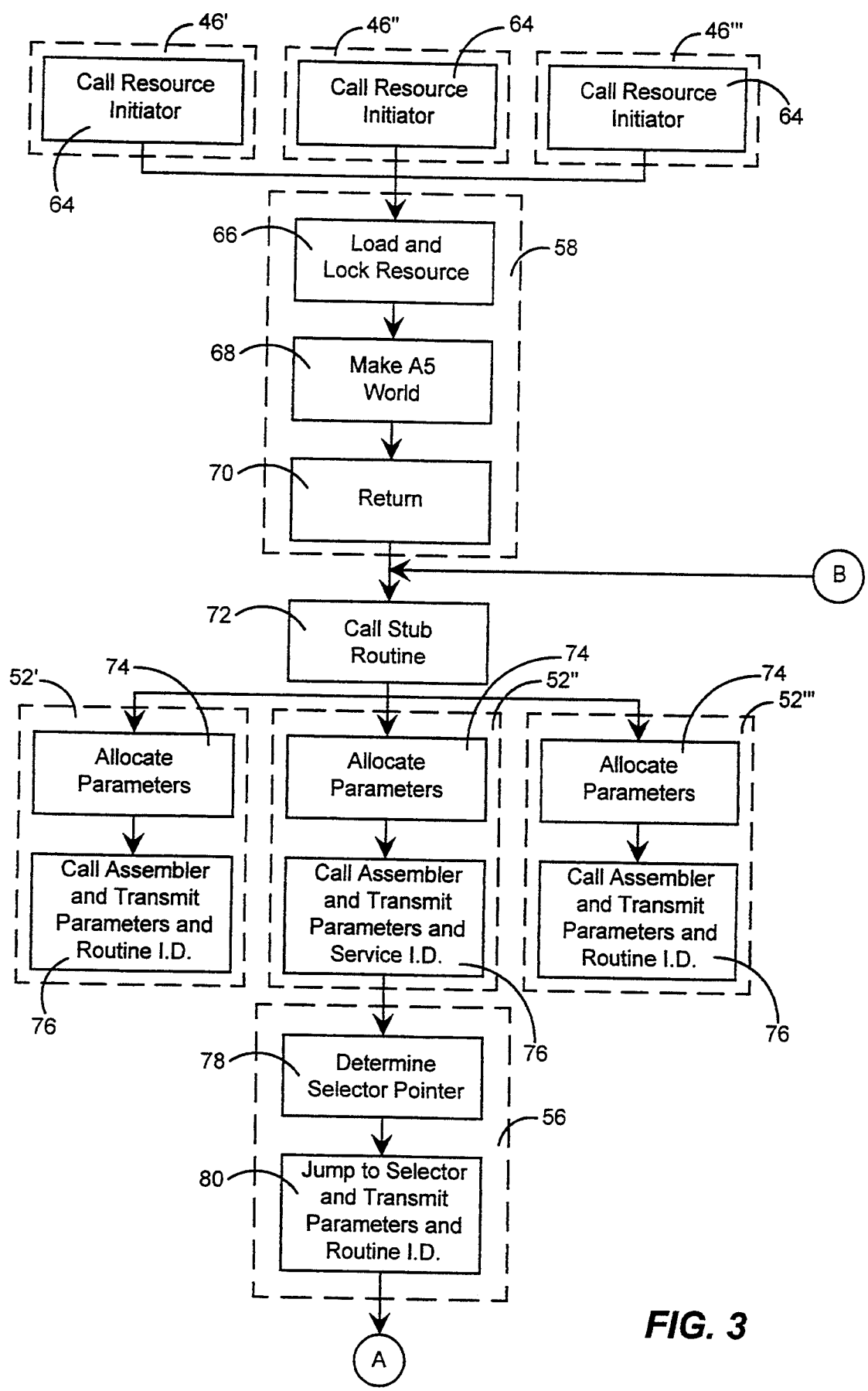
FIG. 3 is a flow diagram of a dynamic-link library emulation system according to the present invention.

FIG. 3 shows a flowchart of the dynamic-link library method performed according to the preferred embodiment of the present invention. As shown an FIG. 3, one of the application programs 46 that is executing starts the method by calling the resource initiator routine 58 in step 64. In step 66, the resource initiator routine loads the code resource 48 into the working memory 16 and locks the code resource to ensure that the memory manager 34 does not move or overwrite it. In a preferred embodiment, the resource initiator loads the code resource in one block that may exceed 32K bytes. The Macintosh MPW 3.2 linker has an option designated br__on that adds flags or islands every 32K bytes within the code resource to provide jumping points for access within the code resource. The flags allow the code resource to be used with early versions of Macintosh computers that used Motorola MC68000 microprocessors, which were unable to specify offsets greater than 32K. Alternatively, Macintosh computers using a Motorola MC68020 or later version of the Motorola MC680x0 microprocessor family have the ability to specify offsets much greater than 32K bytes, such that no flags or segments are necessary.

The resource initiator 58 makes a resource A5 world 59 for the code resource 48 in step 68 by allocating the resource global variables space 60 shown in FIG. 2. The resource global variables space stores global variables that can be used by any of the routines that comprise the code resource, including the selector routines and the service routines. Although the code resource could be implemented by passing parameters between routines, the use of global variables is much more efficient, especially when there are many routines in the code resource. The MakeA5World routine disclosed on pages 14–15 of *Macintosh Technical Note* #256 can be used to make the A5 world for the code resource. After making the A5 world the resource initiator returns control, in step 70, to the program 46 that called the resource initiator.

When the current program 46' desires a service to be performed by a service routine 50', in step 72 of FIG. 3 the current program calls a stub routine 52' corresponding to the desired service routine. The stub routine allocates parameters for the corresponding service routine in step 74 by creating space in the working memory 16 (FIG. 2) for the parameters. In step 76 the stub routine calls the interface routine 56 and transmits to the interface routine the parameters and a service routine I.D. that identifies which service routine corresponds to the stub routine. In step 78 the interface routine translates the index to the code resource 48 into a pointer to the selector routine 54 as discussed above. In step 80 the interface jumps to the selector routine using the translated selector routine pointer and transmits the routine I.D. and the parameters to the selector routine.

Figure 4:
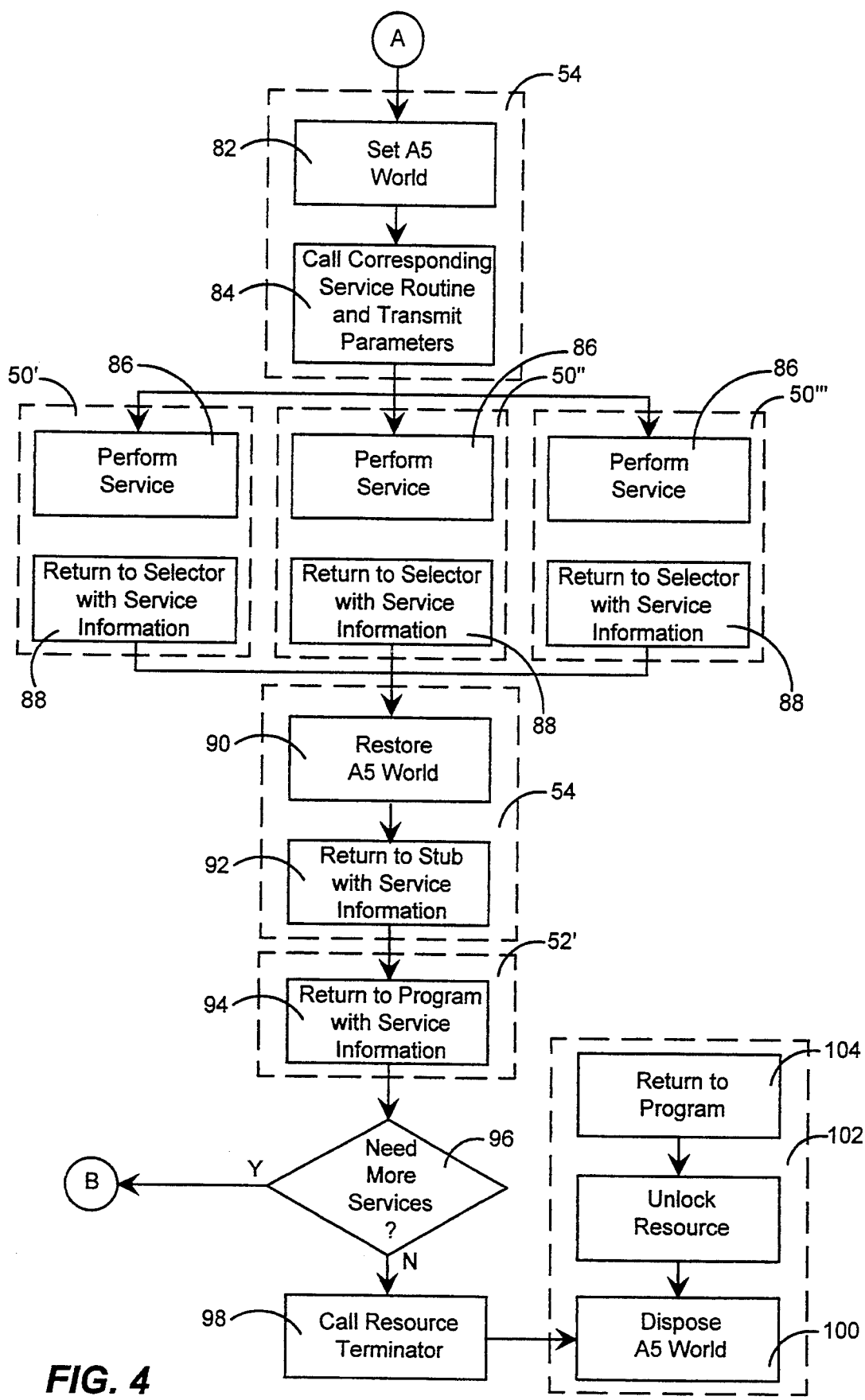
FIG. 4 is a continuation of the flow diagram of FIG. 3.

In order to allow the service-routine 50' corresponding to the called stub routine 52' to use the A5 world made by the resource initiator 58, the selector routine 54 sets the A5 world in step 82 (FIG. 4). The SetA5World routine disclosed on pages 14–15 of *Macintosh Technical Note* #256 can be used to set the A5 world for the code resource. To set the A5 world the selector routine saves the old A5 pointer 40 for the application global variables space 42 (FIG. 2) and sets the A5 register to point to the resource global variables space 60. In step 84 the selector routine calls the appropriate service routine 50' and passes to it the parameters allocated by the corresponding stub routine 52'.

After the called service routine 50' performs its intended service, in step 86, program control returns in step 88 to the selector routine 54 with any information produced by the service routine. The information returned varies with the service and may include status codes, error codes, and other responsive information. In step 90 the selector routine restores the A5 world of the current program 46' and unlocks the A5 world of the code resource 48. The selector routine restores the main program A5 world by retrieving the saved old A5 pointer value and putting it back into the A5 register. The RestoreA5World routine disclosed on pages 14–15 of *Macintosh Technical Note* #256 can be used to restore the A5 world for the current program.

In step 92 of a preferred embodiment, the selector routine 54 returns to the stub routine 52' called by the current program 46' with any responsive information provided by the corresponding service routine 50'. The stub routine relays the responsive information back to the current program in step 94. Alternatively, the service routine can place responsive information in a memory buffer that is accessed directly by the stub routine or the current program without passing through the selector. In another alternative embodiment, the service routine performs a service that does not produce any responsive information, such as playing a sound or displaying an object to the user.

In step 96 the current program 46' determines whether other service routines 50 in the code resource 48 are needed. If another service routine is needed, then the method returns to step 72 to call one of the stub routines 52. When the code resource 48 is no longer needed, one of the programs 46 calls the resource terminator routine 62 (FIG. 2) in step 98 (FIG. 4). In step 100 the resource terminator routine disposes of the code resource A5 world, thereby preventing re-use of the A5 world without re-making it. The DisposeA5World routine disclosed on pages 14–15 of *Macintosh Technical Note #256* can be used to dispose of the A5 world for the code resource. In step 102 the resource terminator routine unlocks the code resource, which frees the memory space occupied by the code resource used for other purposes. In step 104 execution returns to the application program 18 that called the code resource.

The dynamic-link library system 44 of the present invention is particularly useful in connection with the interface and method disclosed in copending U.S. application entitled TEXT CHECKING APPLICATION PROGRAMMING INTERFACE, filed on Sep. 3, 1992, and having Ser. No. 07/939,827, which is incorporated by reference herein in its entirety. A preferred embodiment of the text checking interface includes a text checking module that includes several routines that together perform text checking for a program. When used with the emulation system 30 of the present invention, each of the routines of the text checking module is a service routine. A selector routine and corresponding stub routines interface the service routines with programs such as word processing programs.

When used with the Windows operating system the text checking module is preferably supplied as a dynamic-link library. The present invention provides dynamic-linking capabilities for using the text checking interface on the Macintosh and other similar computers that are similar to the capabilities provided by a Windows dynamic-link library. In particular, the present invention allows one or more programs to access any of the routines of the text checking module without having to redundantly copy the routines into the executable file of each main program.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method implemented on a computer, of providing a dynamic-link library by interfacing a program with a stand-alone code resource that includes a plurality of service routines to allow the program to use each of the service routines individually without copying the service routines into the program, the program and code resource being located in a memory of the computer, the computer executing an operating system that lacks a dynamic-link library, comprising:

accessing a stub routine associated with one of the service routines, the stub routine being located in the memory and including selection information identifying the associated service routine;

transmitting from the stub routine to a selector routine the selection information that identifies the associated service routine, the selector routine being located in the memory and being associated with the code resource;

accessing the associated service routine using the selection information, the associated service routine thereby being dynamically linked to the program via the stub and selector routines; and performing a service for the program using the associated service routine.

2. The method of claim 1, further including:

saving a value stored in a first location into a second location, the value being an index to memory space where program global variables used by the program are stored;

allocating space for storing resource global variables for use by the code resource;

storing in the first location an index to the space for storing resource global variables; and restoring the saved index to the program global variables into the first location after the service routine performs its service.

3. The method of claim 1, further including:

accessing the stub routine with information responsive to the service performed by the associated service routine; and passing the responsive information from the stub routine to the program.

4. The method of claim 1, further including incorporating the selector routine into the code resource.

5. The method of claim 1, further including:

sending the selection information to an interface routine that contains addressing information needed for accessing the selector routine; and sending the selection information from the interface routine to the selector routine.

6. The method of claim 5, further including:

translating with the interface routine an index to the code resource into a selector pointer to the selector routine; and accessing the selector routine using the selector pointer and passing the selection information to the selector routine.

7. The method of claim 1, further including:

calling a resource initialization routine;

loading and locking the code resource into memory using the resource initialization routine;

saving a value stored in a first location into a second location, the value being an index to memory space where program global variables used by the program are stored;

allocating resource global variables space for storing resource global variables used by the code resource using the resource initialization routine; and storing in the first location an index to the resource global variables space.

8. The method of claim 7, further including:

calling a resource termination routine;

unlocking with the resource termination routine the code resource in memory; and disposing of the index to the resource global variables space using the resource termination routine.

9. A method, implemented on a computer, of providing a dynamic-link library by interfacing a program with a stand-alone code resource that includes a plurality of service routines to allow the program to use each of the service routines individually without copying the service routines into the program, the program and code resource being located in a memory of the computer, the computer executing an operating system that lacks a dynamic-link library, comprising:

calling from the program a stub routine associated with one of the service routines, the stub routine being located in the memory and including selection information identifying the associated service routine;

transmitting from the stub routine to a selector routine the selection information that identifies the associated service routine, the selector routine being located in the memory and being associated with the code resource;

accessing the associated service routine using the selection information, the associated service routine thereby being dynamically linked to the program via the stub and selector routines; and performing a service for the program using the associated service routine.

10. The method of claim 9 wherein the stub routine allocates parameters for use by the associated service routine and passes the parameters to the selector routine.

11. The method of claim 9, wherein the enabling step includes:

saving in a second location a value stored in a first location, the value stored being an index to memory space where program global variables used by the program are stored;

allocating resource global variables space for storing resource global variables for use by the code resource; and storing in the first location an index to the resource global variables space.

12. The method of claim 9, further including:

the stub routine accessing information responsive to the service performed by the associated service routine; and passing the responsive information from the stub routine to the current main program.

13. The method of claim 9, further including:

saving in a new location a value stored in a register, the value stored being an index to memory space where global variables used by the program are stored;

storing in the register an index to memory space where global variables used by the code resource are stored; and restoring the global variable index saved for the program into the register after the service routine performs its service.

14. The method of claim 9, further including incorporating the selector routine into the code resource.

15. The method of claim 9, further including:

sending the selection information to an interface routine that contains addressing information needed for accessing the selector routine; and sending the selection information from the interface routine to the selector routine.

16. The method of claim 15, further including:

translating an index to the code resource into a selector pointer to the selector routine using the interface routine; and accessing the selector routine using the selector pointer and passing the selection information to the selector routine.

17. The method of claim 9, further including:

calling a resource initialization routine;

loading and locking the code resource into memory using the resource initialization routine;

allocating resource global variables space for storing resource global variables used by the code resource using the resource initialization routine; and storing in a first location an index to the resource global variables space.

18. The method of claim 17, further including:

calling a resource termination routine;

unlocking with the resource termination routine the code resource in memory; and disposing of the index to the resource global variables space using the resource termination routine.

19. A dynamic-link library system for providing services for a program without copying service routines that perform the services into the program and without using an operating system that includes a dynamic-link library, the system employing a computer having a computer processing unit and a computer memory device, comprising:

a code resource stored in the computer memory device and including a plurality of service routines designed to perform services for the program;

a stub routine stored in the computer memory device and associated with one of the service routines, the stub routine being accessible by the program, the stub routine containing selection information that identifies the associated service routine; and a selector routine stored in the computer memory device and associated with the code resource, and accessible by the stub routine to receive the selection information from the stub routine, and in response thereto access the associated service routine and cause the associated service routine to perform its intended service;

means for accessing the stub routine from the program;

means for implementing the stub routine, accessing the selector routine, and passing the selection information to the selector routine from the stub routine;

means for accessing the associated service routine using the selection information from the stub routine in response to accessing the selector routine; and means for implementing the intended function of the associated service routine.

20. The dynamic-link library system of claim 19 wherein the program is an application program.

21. The dynamic-link library system of claim 19 wherein the stub routine includes means for allocating parameters for use by the associated service routine and means for passing the parameters to the selector routine.

22. The dynamic-link library system of claim 19, further including:

means for saving a value stored in a first location in a second location, the value stored being an index to program global variables space where program global variables used by the program are stored;

means for allocating resource global variables space for storing resource global variables for use by the associated service routine; and means for storing in the first location an index to the resource global variables space.

23. The dynamic-link library system of claim 19 wherein the stub routine means for accessing information responsive to the service performed by the associated service routine and means for passing the responsive information to the program.

24. The dynamic-link library system of claim 19, further including:

means for saving in a new location a value stored in a register, the value stored being a program global variables index to memory space where global variables used by the program are stored;

means for storing in the register an index to resource global variables space where resource global variables used by the associated service routine are stored; and means for restoring the program global variables index into the register after the service routine performs its service.

25. The dynamic-link library system of claim 19 wherein the code resource includes the selector routine.

26. The dynamic-link library system of claim 19, further including:

an interface routine that contains addressing information needed for accessing the selector routine, the interface routine being stored in the memory device and being implemented by the processing unit to receive the selection information from the stub routine and send the selection information to the selector routine.

27. The dynamic-link library system of claim 26 wherein the interface routine includes:

means for translating an index to the code resource into a selector pointer to the selector routine; and means for accessing the selector routine using the selector pointer.

28. The dynamic-link library system of claim 19, further including:

a resource initializer that loads and locks the code resource into the memory device and allocates resource global variables space for storing resource global variables used by the code resource.

29. The dynamic-link library system of claim 28, further including:

an index to the resource global variables space; and a resource terminator that unlocks the code resource in the memory device and disposes of the index to the resource global variables space.

* * * * *